US010609250B2

(12) United States Patent
Ibaraki

(10) Patent No.: US 10,609,250 B2
(45) Date of Patent: Mar. 31, 2020

(54) IMAGE READING APPARATUS AND METHOD FOR CONTROLLING THE SAME

(71) Applicant: KONICA MINOLTA, INC., Chiyoda-ku, Tokyo (JP)

(72) Inventor: Hiroshi Ibaraki, Okazaki (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/488,901

(22) Filed: Apr. 17, 2017

(65) Prior Publication Data
US 2017/0318187 A1 Nov. 2, 2017

(30) Foreign Application Priority Data

Apr. 27, 2016 (JP) ................. 2016-089025

(51) Int. Cl.
H04N 1/04 (2006.01)
H04N 1/40 (2006.01)
H04N 1/407 (2006.01)
H04N 1/00 (2006.01)
H04N 1/10 (2006.01)
H04N 1/193 (2006.01)

(52) U.S. Cl.
CPC ..... H04N 1/40056 (2013.01); H04N 1/00013 (2013.01); H04N 1/00411 (2013.01); H04N 1/00551 (2013.01); H04N 1/1061 (2013.01); H04N 1/193 (2013.01); H04N 1/4076 (2013.01); H04N 2201/0081 (2013.01)

(58) Field of Classification Search
CPC ........... H04N 1/40056; H04N 1/00013; H04N 1/00411; H04N 1/1061; H04N 1/193

USPC ................................. 358/474, 475
See application file for complete search history.

(56) References Cited

U.S. PATENT DOCUMENTS 7,729,009 B2 * 6/2010 Ohkawa ............... H04N 1/38
358/1.9
7,952,770 B2 * 5/2011 Ikeno ............... H04N 1/00814
358/461

(Continued)

FOREIGN PATENT DOCUMENTS

CN 103856663 A 6/2014
CN 104104818 A 10/2014

(Continued)

OTHER PUBLICATIONS

Chinese Office Action dated Oct. 15, 2018 (and English translation thereof) issued in counterpart Chinese Application No. 201710268783.5.

(Continued)

Primary Examiner — Dung D Tran
(74) Attorney, Agent, or Firm — Holtz, Holtz & Volek PC

(57) ABSTRACT

An image reading apparatus according to the present disclosure includes a platen glass, an image reader, and an output interface. An original is placed on the platen glass. The image reader is configured to read an image of the original on the platen glass. The image reader includes at least one sensor configured to detect a quantity of light for each of a plurality of regions on the platen glass. The output interface is configured to output information which identifies one or more regions of the plurality of regions in which the quantity of light detected therefrom exceeds a given value.

7 Claims, 18 Drawing Sheets

(56) References Cited

U.S. PATENT DOCUMENTS

| | | | |
|---|---|---|---|
| 7,969,622 B2* | 6/2011 | Saika | H04N 1/0071 358/461 |
| 8,310,736 B2* | 11/2012 | Nakajima | H04N 1/00835 358/461 |
| 9,082,006 B2 | 7/2015 | Kiriyama | |
| 9,277,073 B2* | 3/2016 | Hanamura | H04N 1/00708 |
| 9,654,670 B2* | 5/2017 | Horita | H04N 1/6055 |
| 9,774,762 B2* | 9/2017 | Doi | H04N 1/60 |
| 2004/0233478 A1* | 11/2004 | Ishido | H04N 1/00681 358/449 |
| 2007/0035789 A1* | 2/2007 | Ohkawa | H04N 1/38 358/522 |
| 2014/0146342 A1 | 5/2014 | Ishii et al. | |
| 2014/0300918 A1 | 10/2014 | Kiriyama | |
| 2015/0062664 A1 | 3/2015 | Hanamura et al. | |
| 2018/0220027 A1* | 8/2018 | Kusuhata | H04N 1/047 |

FOREIGN PATENT DOCUMENTS

| | | |
|---|---|---|
| CN | 104427195 A | 3/2015 |
| JP | 2001160890 A | 6/2001 |
| JP | 2001183760 A | 7/2001 |
| JP | 2004264529 A | 9/2004 |
| JP | 2004333676 A | 11/2004 |
| JP | 2012222654 A | 11/2012 |

OTHER PUBLICATIONS

Chinese Office Action dated Apr. 10, 2019 (and English translation thereof) issued in counterpart Chinese Application No. 201710268783.5.

Chinese Office Action dated Jul. 12, 2019 (and English translation thereof) issued in counterpart Chinese Application No. 201710268783.5.

Chinese Office Action dated Nov. 4, 2019 (and English translation thereof) issued in Chinese Application No. 201710268783.5.

Japanese Office Action dated Jan. 7, 2020 (and English translation thereof) issued in Japanese Patent Application No. 2016-089025.

\* cited by examiner

IMAGE READING APPARATUS AND METHOD FOR CONTROLLING THE SAME

This application is based on Japanese Patent Application(s) No. 2016-089025 filed with the Japan Patent Office on Apr. 27, 2016, the entire content of which is hereby incorporated by reference.

BACKGROUND OF THE INVENTION

Field of the Invention

The present disclosure relates to an image reading apparatus and a method for controlling the same, and particularly to an image reading apparatus for handling an effect of ambient light on a platen and a method for controlling the same.

Description of the Related Art

Conventionally, for image reading apparatuses, an effect of ambient light on a platen has been variously considered. For example, Japanese Laid-Open Patent Publication No. 2004-333676 discloses an image reading apparatus comprising a means for detecting a quantity of external light. When a quantity of external light for the entirety of a transparent platen exceeds a preset threshold value, an error state is recognized, and the image reading apparatus prohibits performing an image reading operation and informs that the apparatus is in the error state.

When an error state is generated, the technique described in Japanese Laid-Open Patent Publication No. 2004-333676 can prohibit performing an image reading operation or indicate the prohibition, however, it cannot provide the user with more beneficial information.

In view of the above circumstances, there is a demand for a technique for allowing an image reading apparatus to provide users with more beneficial information when a platen receives ambient light.

SUMMARY OF THE INVENTION

According to an aspect of the present disclosure, an image reading apparatus is provided. The image reading apparatus comprises a platen glass, an image reader, and an output interface. An original is placed on the platen glass. The image reader is configured to read an image of the original on the platen glass. The image reader includes at least one sensor configured to detect a quantity of light for each of a plurality of regions on the platen glass. The output interface is configured to output information which identifies one or more regions of the plurality of regions in which the quantity of light detected therefrom exceeds a given value.

The image reader may include a light source for radiating light to the platen glass. The output interface may output the information in a case where the image reader reads the quantity of light when the light source radiates light to the platen glass.

The image reader may include a light source for radiating light to the platen glass. The output interface may output the information in a case where the image reader reads the quantity of light when the light source does not radiate light to the platen glass.

The output interface may output information which determines a rectangle included in a region on the platen glass in which the quantity of light read therefrom does not exceed the given value.

The output interface may output information representing that ambient light is not detected in any region of the platen glass when the quantity of light does not exceed the given value in any of the plurality of regions.

The output interface may output information representing that ambient light is detected in all of the regions of the platen glass when the quantity of light exceeds the given value in all of the plurality of regions.

The output interface may include a display device configured to schematically display the platen glass and schematically display a region of the platen glass identified by the information output.

The output interface may include an indicator for pointing to a position on the platen glass corresponding to the information.

According to another aspect of the present disclosure, a method for controlling an image reading apparatus is provided. The method comprises: reading a quantity of light incident on each of a plurality of regions on a platen glass for mounting an original thereon; and outputting information which identifies one or more regions of the plurality of regions in which the quantity of light read therefrom exceeds a given value.

Reading the quantity of light may include reading the quantity of light in a state where a platen cover which covers the platen glass is opened.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereafter, reference will be made to the drawings to describe an embodiment of an image reading apparatus. In the following description, identical parts and components are identically denoted. Their names and functions are also identical. Accordingly, they will not be described repeatedly.

(1) Outline of Image Reading Apparatus

Figure 1:
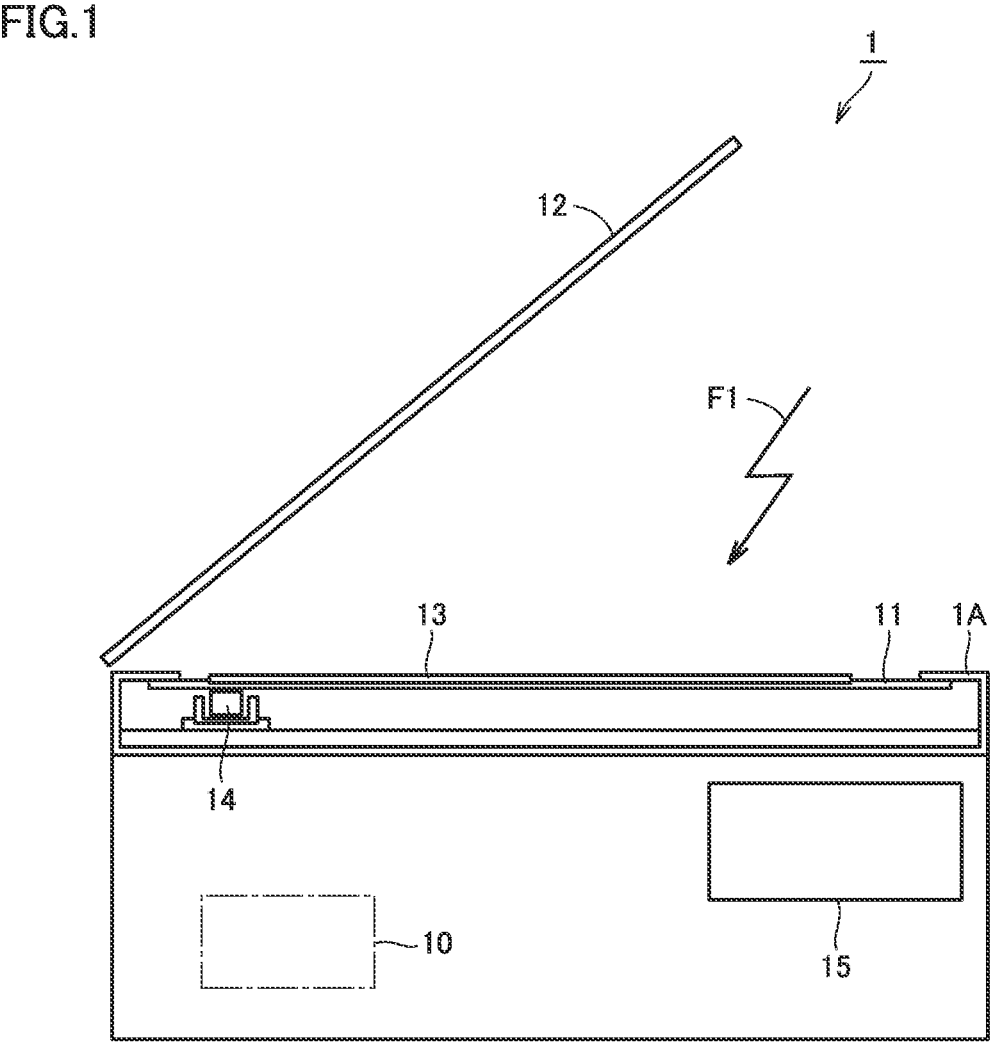
FIG. 1 shows one embodiment of an image reading apparatus according to the present disclosure.

FIG. 1 shows one embodiment of an image reading apparatus according to the present disclosure. An image reading apparatus 1 of FIG. 1 includes a body 1A and a platen cover 12. Body 1A includes a control unit 10 which controls an operation of image reading apparatus 1, a platen glass 11 for placing an original thereon, a scanner unit 14 which reads an image of an original on platen glass 11, and a console panel 15. In FIG. 1, an original placed on platen glass 11 is indicated as an original 13. Scanner unit 14 is an example of an image reader for reading an image of original 13 on platen glass 11 in response to a quantity of light incident via platen glass 11.

Platen cover 12 covers platen glass 11. Scanner unit 14 has a main scanning direction corresponding to a direction traversing the plane of the sheet of FIG. 1. Platen cover 12 has one end in the main scanning direction of scanner unit 14 fixed to body 1A.

Figure 2:
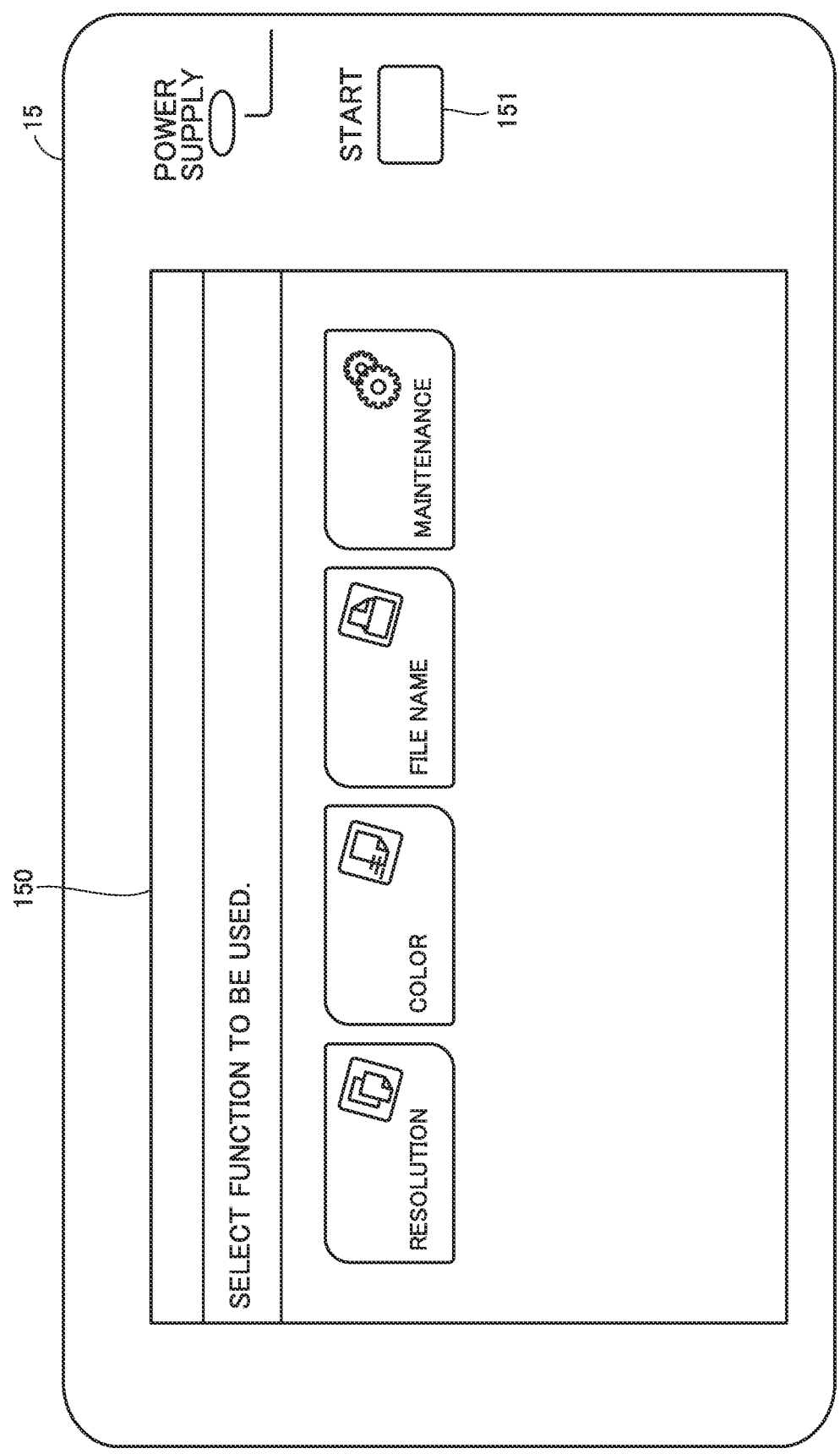
FIG. 2 shows an example of an appearance of a console panel.

FIG. 2 shows an example of an appearance of console panel 15. As shown in FIG. 2, console panel 15 includes a touch panel 150 and a hardware button 151 such as a start key. Touch panel 150 can display a software key for setting each of various functions such as "resolution" (a setting of a resolution in reading an image).

Scanner unit 14 includes a light source (a light source 14A of FIG. 5 described later). Scanner unit 14 radiates light under platen glass 11 and reads light reflected from platen glass 11. Scanner unit 14 reads the reflected light while scanning in the main scanning direction and a sub scanning direction to generate data of an image of an original on platen glass 11.

Figure 3:
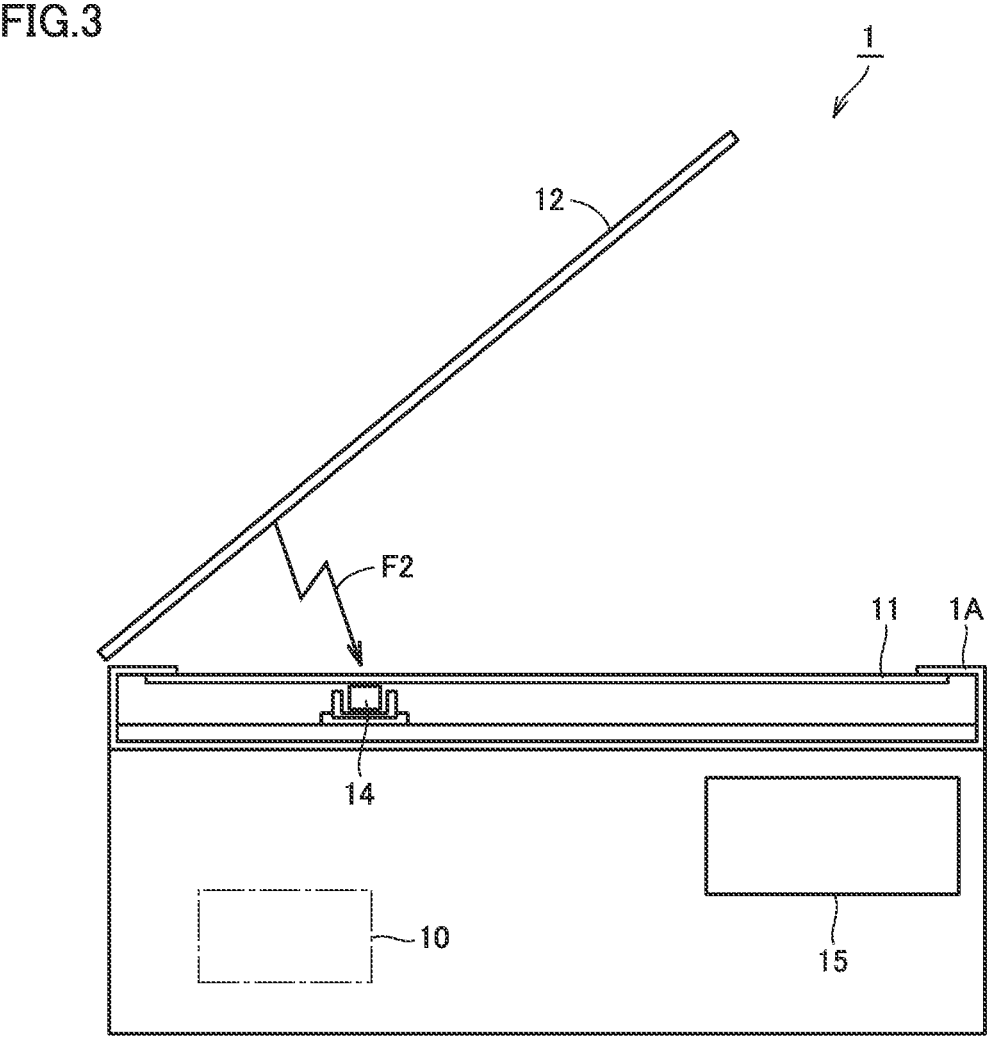
FIG. 3 shows light reflected by a platen cover in the image reading apparatus.

Based on a quantity of a light passing through platen glass 11 and detected by scanner unit 14, image reading apparatus 1 can detect ambient light received by platen glass 11. The ambient light includes light incident on platen glass 11 directly from outside image reading apparatus 1, as indicated in FIG. 1 by ambient light F1. FIG. 3 shows light reflected by platen cover 12 in image reading apparatus 1. In image reading apparatus 1, scanner unit 14 can detect light output from the light source of scanner unit 14, reflected by platen cover 12, and passing through platen glass 11, as indicated in FIG. 3 by light F2.

Detecting ambient light in image reading apparatus 1 includes a first mode and a second mode. The first mode is performed in a state where the light source of scanner unit 14 is turned off. The second mode is performed in a state where the light source of scanner unit 14 is turned on. In the first mode, ambient light F1 (see FIG. 1) can mainly be detected. In the second mode, in addition to ambient light F1 (see FIG. 1), ambient light F2 (see FIG. 3) can be detected.

Figure 4:
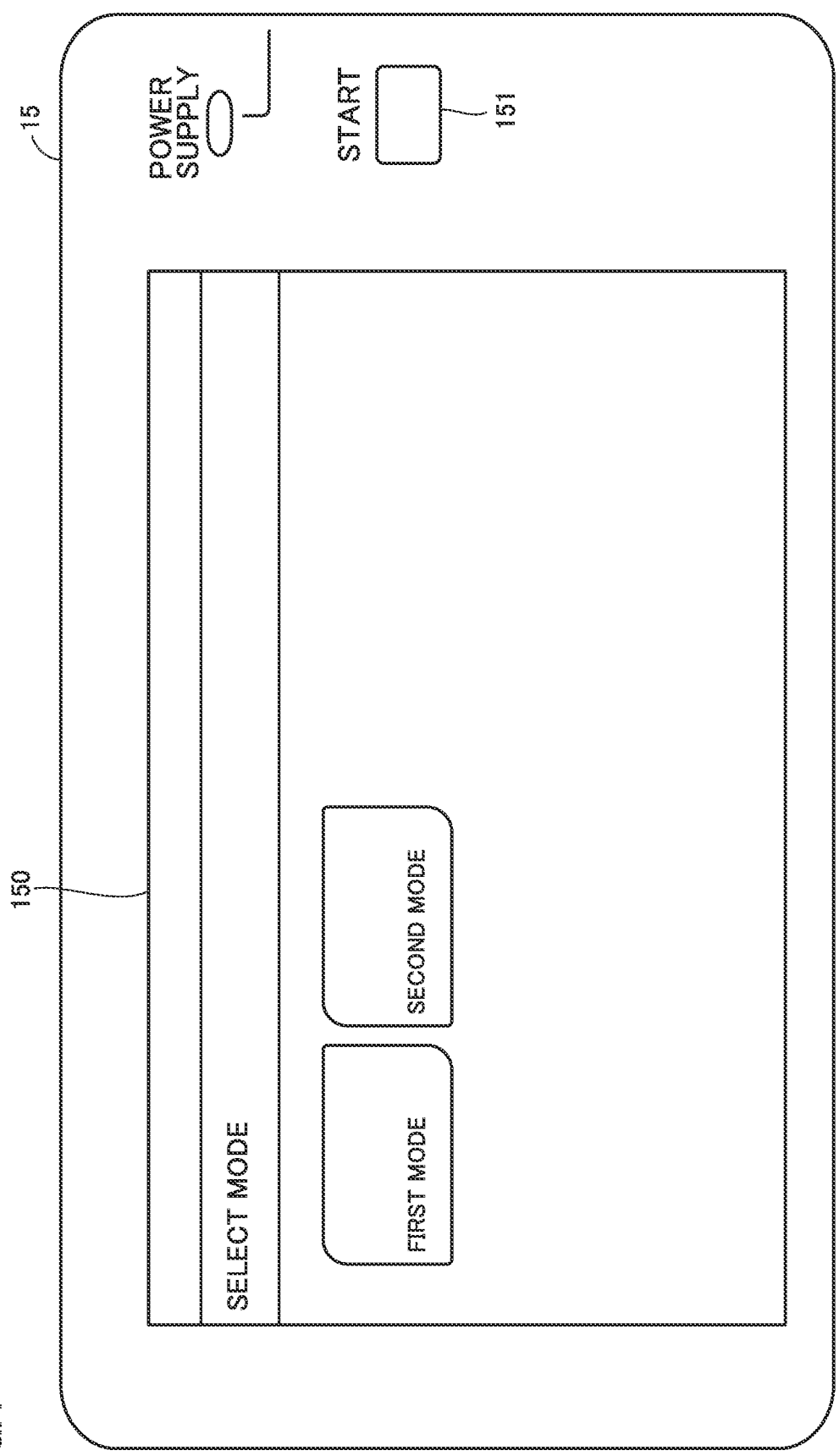
FIG. 4 shows another example of a manner of displaying on a touch panel of the console panel.

FIG. 4 shows another example of a manner of displaying on touch panel 150 of console panel 15. Image reading apparatus 1 accepts a setting of a mode of detecting ambient light in a "maintenance" function. More specifically, touch panel 150 displays a key corresponding to the first mode and a key corresponding to the second mode. A user (or a serviceman for maintaining image reading apparatus 1) can select a key on touch panel 150 to select a mode of detecting ambient light.

(2) Hardware Configuration

Figure 5:
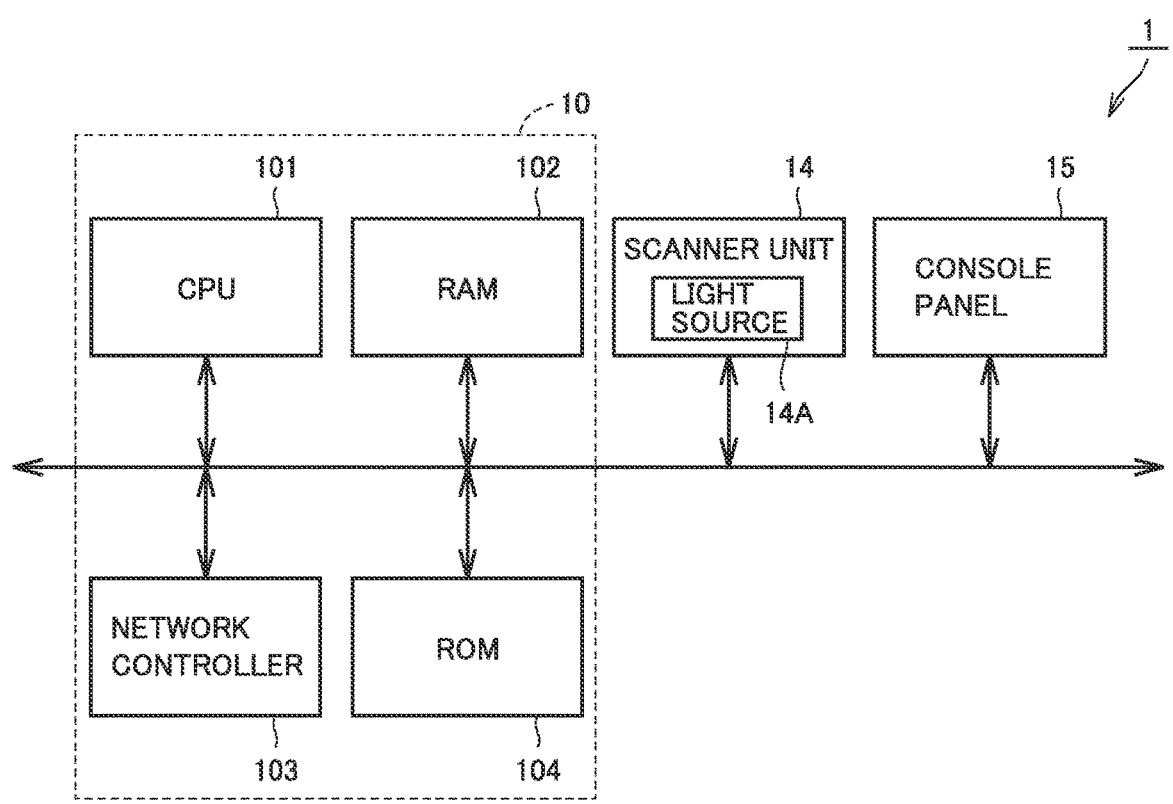
FIG. 5 shows an example of a hardware configuration of the image reading apparatus.

FIG. 5 shows an example of a hardware configuration of image reading apparatus 1. As shown in FIG. 5, image reading apparatus 1 mainly includes control unit 10, scanner unit 14, and console panel 15.

Control unit 10 includes a CPU (Central Processing Unit) 101, a RAM (Random Access Memory) 102 for functioning as a working area when a program is executed in CPU 101, a network controller 103 for controlling communications performed via a network, and a ROM (Read Only Memory) 104 for storing a program or the like executed in CPU 101. Network controller 103 includes a network card, for example. Via network controller 103, CPU 101 transmits data to an external device and receives data from an external device.

(3) Flow of Process (First Mode)

Figure 6:
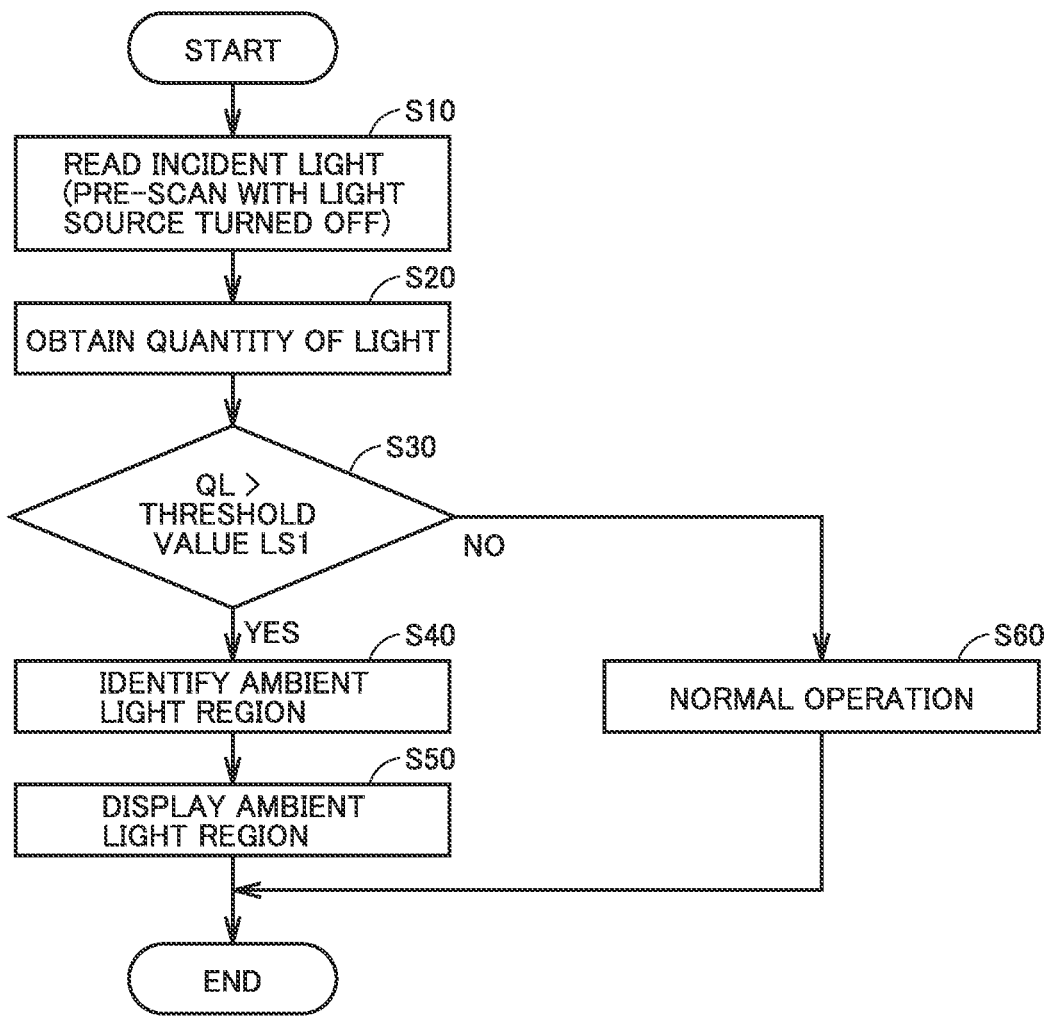
FIG. 6 is a flowchart of a process performed to detect ambient light according to a first mode.

FIG. 6 is a flowchart of a process performed to detect ambient light according to the first mode. The process shown in FIG. 6 is implemented for example by CPU 101 executing a program stored in ROM 104. This process is performed as a portion of a maintenance performed in image reading apparatus 1 for example. CPU 101 performs the process of FIG. 6 in response to the first mode having been selected on touch panel 150 for example.

As shown in FIG. 6, in step S10, CPU 101 causes scanner unit 14 to read a quantity of light incident on the entire region of platen glass 11 in a state where light source 14A is turned off. Subsequently, the control proceeds to step S20.

In step S20, CPU 101 obtains the quantity of light that scanner unit 14 read in step S10. In image reading apparatus 1, as will be described hereinafter, a plurality of regions are defined on platen glass 11. In step S20, CPU 101 obtains a quantity of light for each of the plurality of regions. Subsequently, the control proceeds to step S30.

Figure 7:
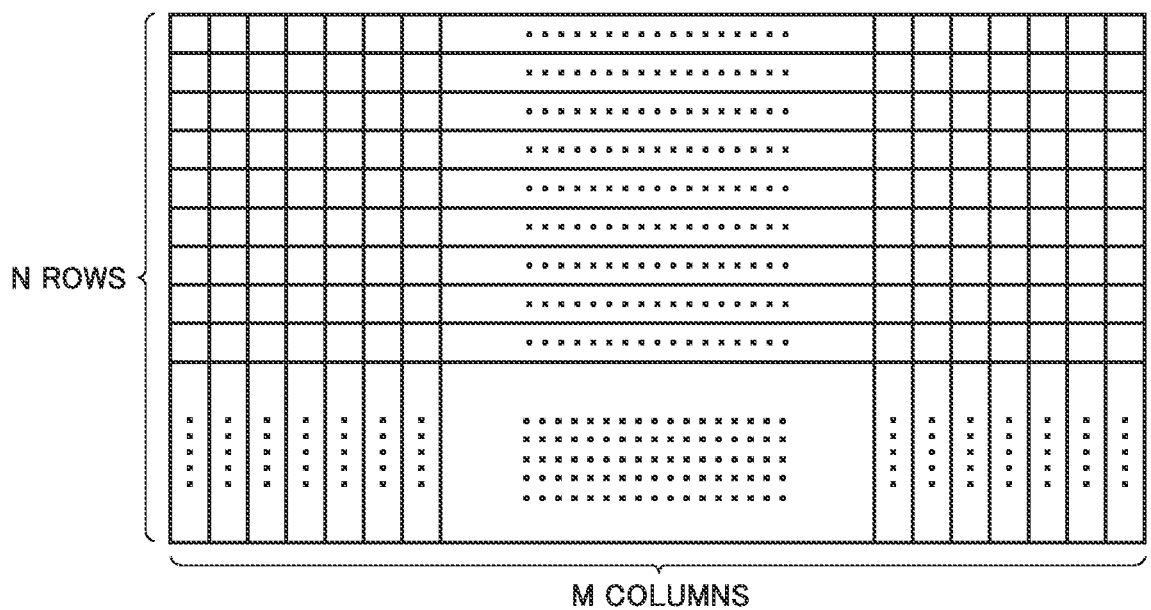
FIG. 7 is a figure for illustrating an example of a manner of defining a plurality of regions on a platen glass.

FIG. 7 is a figure for illustrating an example of a manner of defining a plurality of regions on platen glass 11. FIG. 7 schematically shows a matrix of N rows in a first direction (in FIG. 7, the vertical direction) and M columns in a second direction (in FIG. 7, the horizontal direction) intersecting the first direction. Scanner unit 14 includes a plurality of light receiving elements (for example, CCDs (Charge Coupled Devices)). The light receiving element is one example of a device configured to detect a quantity of light. In FIG. 7, the N×M matrix has a peripheral edge, which corresponds to that of platen glass 11. Each cell of the matrix corresponds to a light receiving region corresponding to one of the plurality of light receiving elements included in scanner unit 14. The plurality of cells of the matrix of FIG. 7 is an example of the plurality of regions defined for platen glass 11. Based on an output of a detection of each light receiving element of scanner unit 14, CPU 101 determines a quantity of light incident on each of the plurality of regions defined on platen glass 11. In image reading apparatus 1, the plurality of regions defined on platen glass 11 may not be arranged in a matrix, as shown in FIG. 7.

In step S30, CPU 101 determines for each of the plurality of regions whether a quantity of light obtained QL exceeds a predetermined threshold value LS1. Threshold value LS1 can be set as appropriate depending on a quantity of ambient light assumed in image reading apparatus 1. When CPU 101 determines that at least one of the plurality of regions receives a quantity of light exceeding the above threshold value (YES in step S30), the control proceeds to step S40. When CPU 101 determines that the plurality of regions all have a quantity of light equal to or less than the above threshold value, the control proceeds to step S60.

In step S40, CPU 101 identifies any of the plurality of regions having a quantity of light exceeding threshold value LS1 in step S30 (hereinafter referred to as an ambient light region). Subsequently, the control proceeds to step S50.

In step S50, CPU 101 displays on touch panel 150 an ambient light region identified in step S40, and ends the process of FIG. 6. Thus, image reading apparatus 1 returns for example to a standby state. Touch panel 150 configured to display an ambient light region is an example of an output interface.

Figure 8:
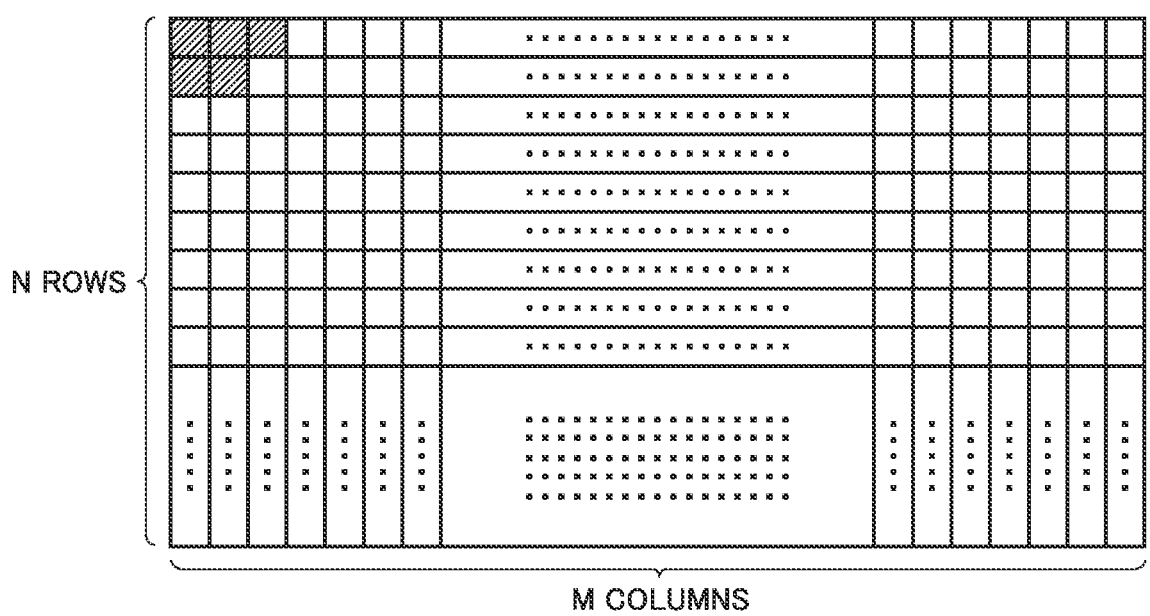
FIG. 8 schematically shows an example of a result of detecting a quantity of light in the plurality of regions.
Figure 9:
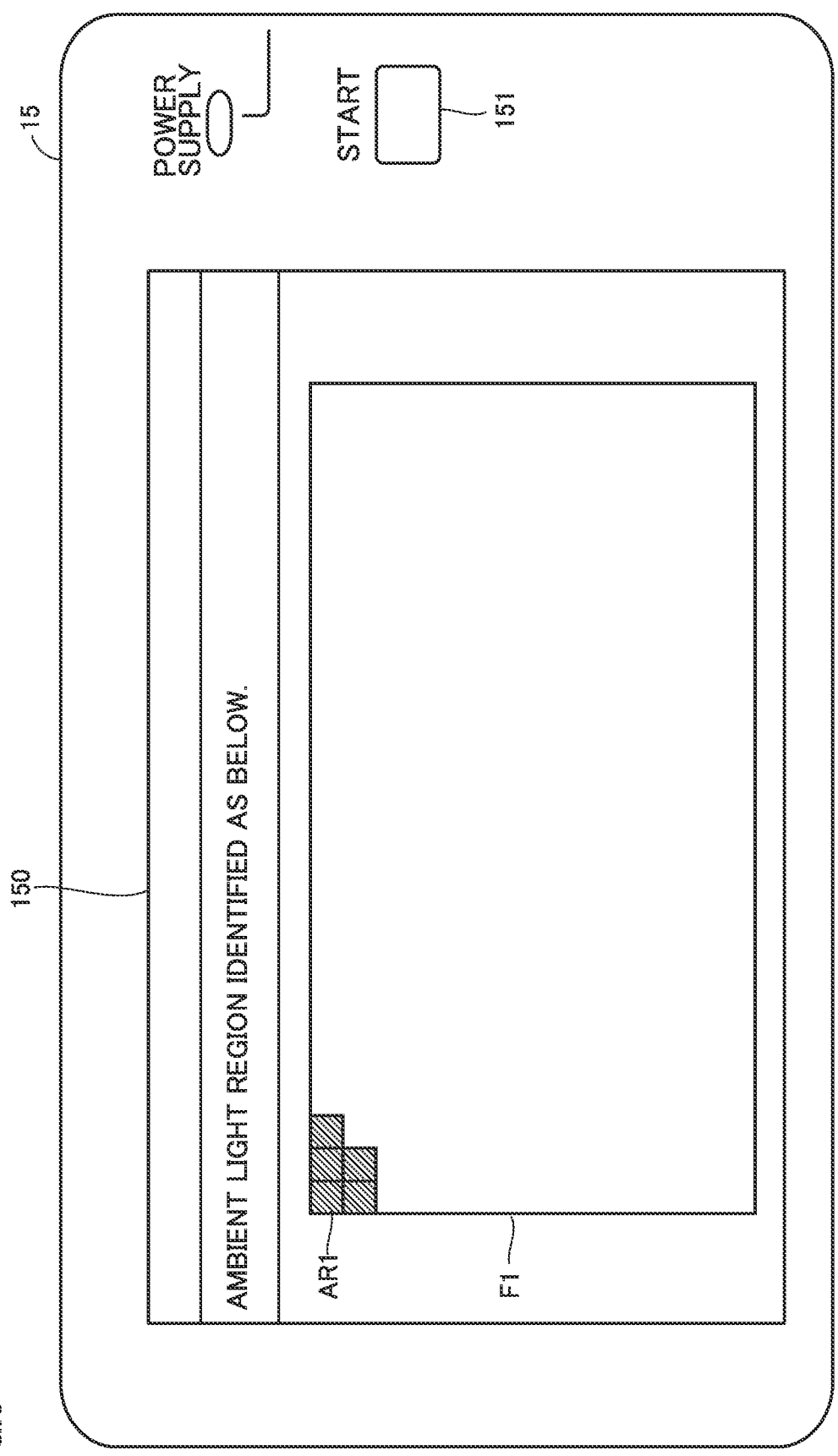
FIG. 9 shows an example of a manner of displaying an ambient light region.

FIG. 8 schematically shows an example of a result of detecting a quantity of light in the plurality of regions. FIG. 9 shows an example of a manner of displaying an ambient light region. As shown in FIG. 8, when a quantity of light detected at a portion of the plurality of regions exceeds threshold value LS1, then, as shown in FIG. 9, touch panel 150 for example displays a frame F1 schematically representing platen glass 11 and furthermore, displays a region AR1 within frame F1. FIG. 8 shows that in the N×M matrix, five hatched upper left cells have a quantity of light exceeding threshold value LS1. In FIG. 9, region AR1 shows a region corresponding to an ambient light region within platen glass 11. Region AR1 is displayed on touch panel 150 in a manner different than the remaining regions within frame F1 (in FIG. 9, hatched). In that case, touch panel 150 is an example of a display device which schematically displays platen glass 11 and a region corresponding to an ambient light region on platen glass 11.

Returning to FIG. 6, in step S60, CPU 101 returns image reading apparatus 1 to a normal state (e.g., the standby state) without performing step S40 and step S50, and ends the process of FIG. 6. CPU 101 in step S60 may display on touch panel 150 information (a message or the like) indicating that ambient light is not detected in any of the plurality of defined regions of platen glass 11.

For example, when a serviceman installs image reading apparatus 1, the serviceman opens platen cover 12 and selects the first mode in a state where original 13 is not placed on platen glass 11 to perform the process shown in FIG. 6. The serviceman can obtain information of a region receiving ambient light incident on platen glass 11. Based on an ambient light region within platen glass 11, the serviceman can for example confirm a relative position of an indoor lighting apparatus and image reading apparatus 1, and a direction in which ambient light is incident on platen glass 11 from the lighting apparatus. This can help the serviceman to determine as a position at which image reading apparatus 1 is installed a position at which ambient light from the lighting apparatus is not incident on platen glass 11.

When the regions of platen glass 11 are all ambient light regions, CPU 101 may display a special message on touch panel 150 in step S50.

(4) Sky Shot Method

Figure 10:
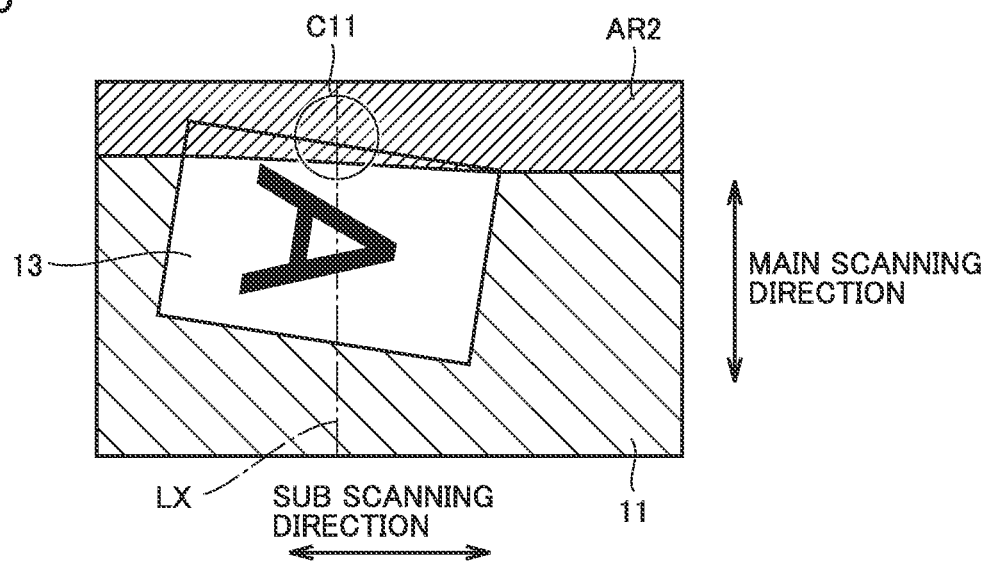
FIG. 10 schematically shows an original disposed on a platen glass.
Figure 11:
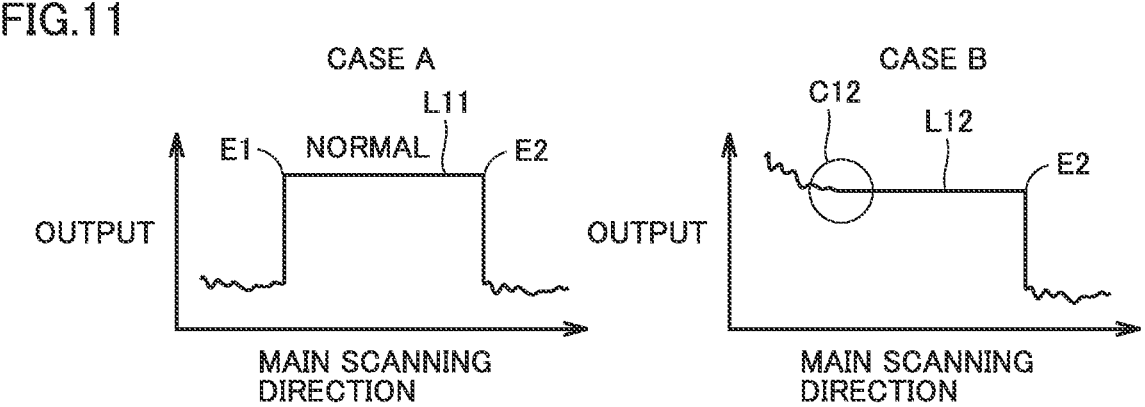
FIG. 11 shows two examples of detection outputs in an example of a line along a main scanning direction.

Image reading apparatus 1 may read an image of an original with platen cover 12 opened. Such an image reading method is referred to as a "sky shot method" for example. FIG. 10 and FIG. 11 are figures for illustrating the sky shot method. FIG. 10 is a figure schematically showing original 13 disposed on platen glass 11. FIG. 11 shows two examples of detection outputs in an example of a line along the main scanning direction.

A user (or a serviceman) opens platen cover 12 and places original 13 on platen glass 11, and in that condition, operates the start key. In response, scanner unit 14 reads an image while turning on light source 14A and scanning in the main scanning direction and the sub scanning direction. More specifically, scanner unit 14 senses light that is reflected from original 13 by a sensor (a sensor for detecting a quantity of light) for each of the plurality of regions. More specifically, scanner unit 14 obtains an output value by AD (analogue-digital) converting and numerically expressing a voltage output from the sensor for each of the plurality of regions.

When platen cover 12 is not closed, a quantity of reflected light of a region of platen glass 11 in which original 13 is not placed is normally, substantially 0. In contrast, in a region in which original 13 is placed, the light output from light source 14A is reflected by original 13, and accordingly, a quantity of reflected light exceeding 0 is provided. CPU 101 determines an edge of original 13 based on a difference in level of an output value.

FIG. 11 shows a case A and a case B. Case A shows a normal detection output as a line L11. Line 11 indicates that a detection output varies at two edges of the original in the main scanning direction, as indicated by edges E1 and E2.

In contrast, when ambient light is incident on platen glass 11, it is difficult to determine an edge from a quantity of light detected in scanner unit 14. More specifically, for example, it is assumed that an upper region AR2 of platen glass 11 of FIG. 10 is a region of platen glass 11 on which ambient light F1 is incident. In the example of FIG. 10, a portion of original 13 is placed within region AR2. When a line L12 in case B shown in FIG. 11 represents an output of a detected quantity of light in the main scanning direction along a line LX shown in FIG. 10, it is difficult to determine an end of original 13 in region AR2 from the detection output. In FIG. 10, a circle C11 represents a vicinity of an end of original 13 in region AR2. In case B of FIG. 11, a circle C12 represents a portion corresponding to circle C11 of FIG. 10. In case B of FIG. 11, as compared with case A, the detection output in circle C12 does not show a significant variation.

Thus, as has been described with reference to FIG. 10 and FIG. 11, when ambient light enters platen glass 11, in particular, when an image of an original is read in the sky shot method, the original's edge cannot be determined, which is inconvenient. In image reading apparatus 1 of the present embodiment, a region of platen glass 11 which ambient light enters is identified, and the identified region is displayed. A serviceman and user who have confirmed the displayed indication can change where image reading apparatus 1 is installed so that the ambient light does not enter platen glass 11.

(5) Flow of Process (Second Mode)

Figure 12:
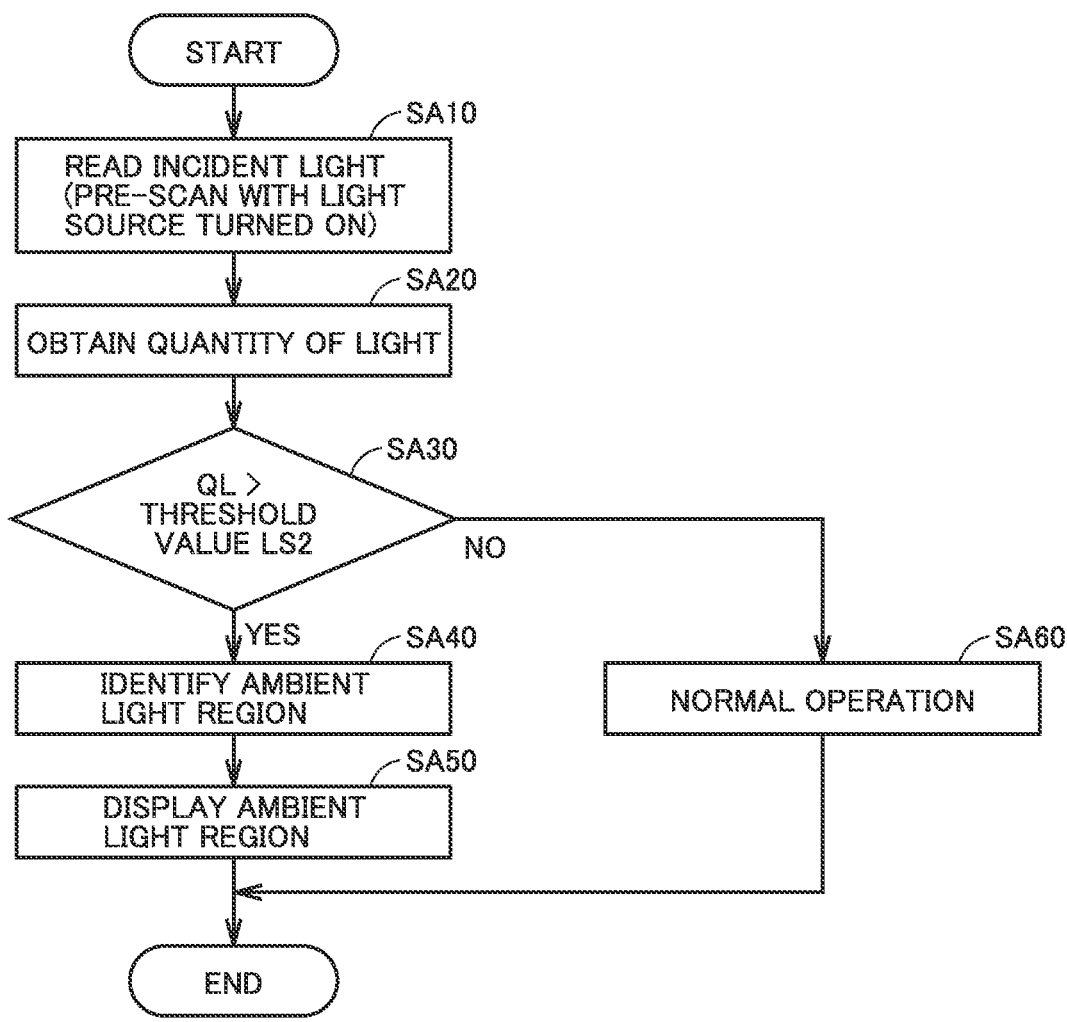
FIG. 12 is a flowchart of a process performed to detect ambient light according to a second mode.

A process performed for the second mode will now be described. In the second mode, a region in which ambient light is generated is identified in a state where light source 14A of scanner unit 14 is turned on. FIG. 12 is a flowchart of a process performed to detect ambient light according to the second mode. The process shown in FIG. 12 is implemented for example by CPU 101 executing a program stored in ROM 104. This process is performed as a portion of a maintenance performed in image reading apparatus 1 for example. CPU 101 performs the process of FIG. 12 in response to the second mode having been selected on touch panel 150 for example.

The process of FIG. 12 includes steps SA10 to SA60 corresponding to steps S10 to S60, respectively, of FIG. 6. As compared with the process of FIG. 6, in the process of FIG. 12, a threshold value used for a quantity of light of each region is different. Preferably, a threshold value LS2 used in the process of FIG. 12 is higher than threshold value LS1 used in the process of FIG. 6. In the process of FIG. 6, light source 14A is not turned on, whereas in the process of FIG. 12, light source 14A is turned on. This is because it is expected that light which scanner unit 14 receives includes light output from light source 14A and reflected by platen cover 12 (i.e., light F2).

That is, the process of FIG. 12 is performed with light source 14A turned on. Scanner unit 14 receives ambient light F1 externally incident on platen glass 11, and in addition thereto, ambient light F2 which is light output from light source 14A and reflected by the platen cover etc. Thus, external ambient light F1, and ambient light from a peripheral member which is attributed to light radiated from inside image reading apparatus 1 (i.e., reflected light) can be detected.

The processes of FIGS. 6 and 12 described above may be performed without or with original 13 placed on platen glass 11.

(6) Notification of Original Placement Permission Region

In step S50 of the process of FIG. 6 or step SA50 of the process of FIG. 12, CPU 101 displays on touch panel 150 information which identifies an ambient light region. Touch panel 150 configured to display the ambient light region is an example of the output interface.

Instead of the information which identifies the ambient light region, CPU 101 may display information which identifies a region other than the ambient light region. On platen glass 11, the region other than the ambient light region is a region expected to be free from a problem associated with detecting an edge of original 13, as has been described with reference to FIG. 10 and FIG. 11. Displaying the information that identifies the region other than the ambient light region allows the user to understand a region on platen glass 11 in which original 13 should be placed.

Figure 13:
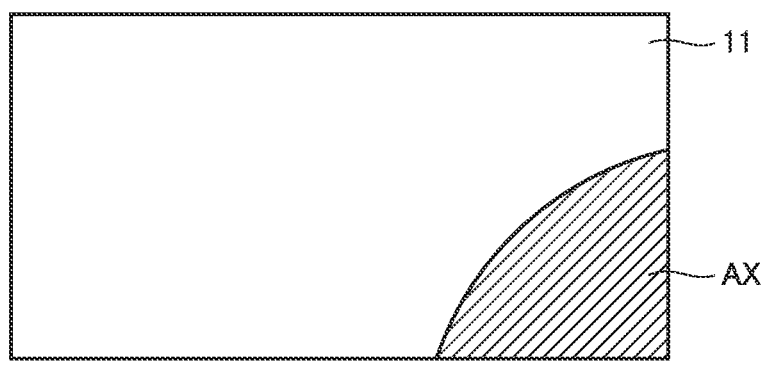
FIG. 13 and FIG. 14 are figures for illustrating a specific example of an original placement permission region.
Figure 14:
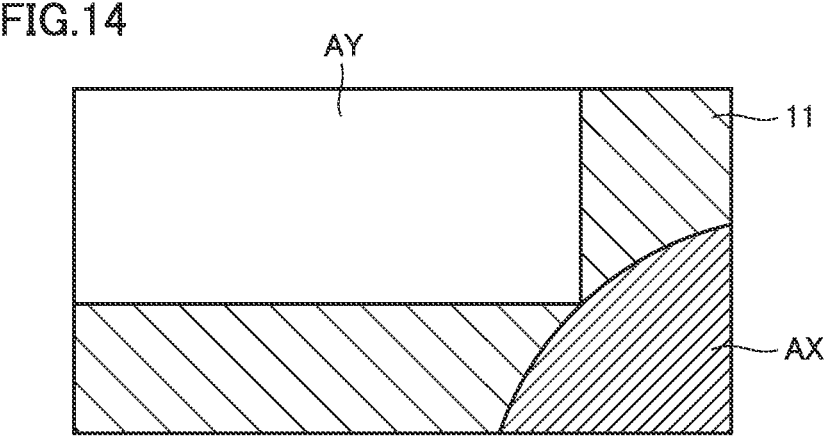

An original placement permission region may be indicated in the form of a rectangular area. FIG. 13 and FIG. 14 are figures for illustrating a specific example of the original placement permission region.

In FIG. 13, an ambient light region on platen glass 11 (a region receiving a quantity of light exceeding threshold value LS1 in the process of FIG. 6 or a region receiving a quantity of light exceeding threshold value LS2 in the process of FIG. 12) is indicated by a region AX. CPU 101 determines from platen glass 11 a largest rectangle set in a portion other than region AX of platen glass 11 as an original placement permission region, for example.

An original placement permission region determined for the example of FIG. 13 is indicated in FIG. 14. In FIG. 14, a region AY is an example of a largest rectangle set on platen glass 11 at a portion other than region AX.

Figure 15:
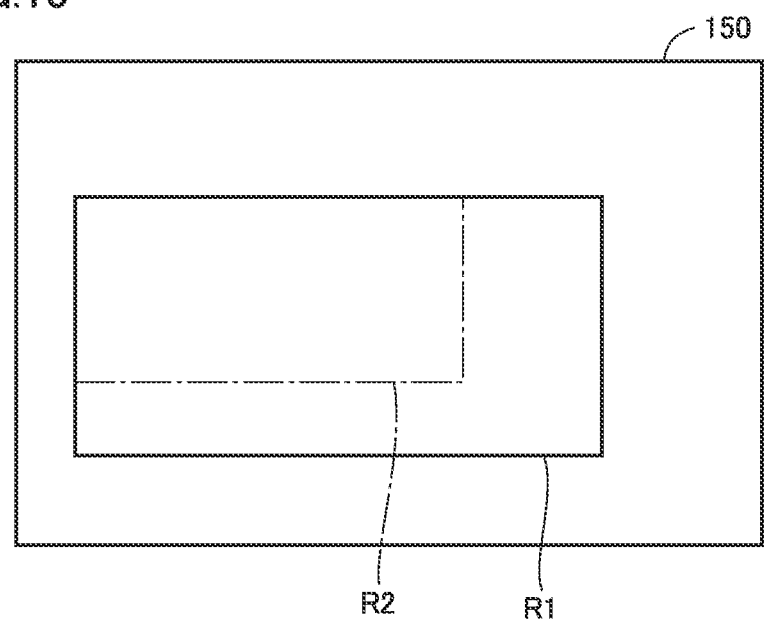
FIG. 15 shows an example of a manner of displaying the original placement permission region.

FIG. 15 shows an example of a manner of displaying the original placement permission region. CPU 101 displays the original placement permission region that is determined as shown in FIG. 14 on touch panel 150 for example in a manner shown in FIG. 15. In FIG. 15, touch panel 150 displays a rectangle R1 which schematically represents platen glass 11, and a rectangle R2 which schematically represents region AY of FIG. 14.

(7) Displaying Original Placement Permission Region by Indicator

Figure 16:
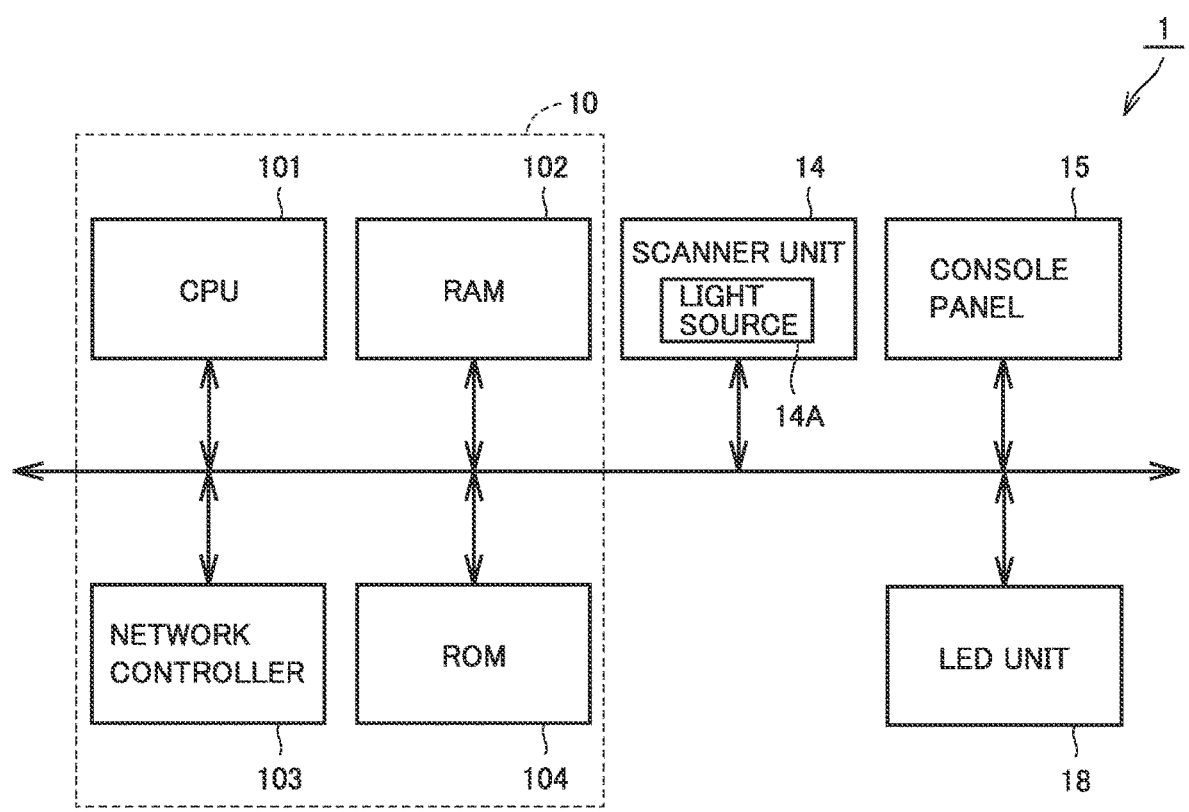
FIG. 16 shows an exemplary variation of a hardware configuration of the image reading apparatus.

Image reading apparatus 1 may include an indicator in a vicinity of platen glass 11 for pointing to an original placement permission region on platen glass 11. FIG. 16 shows an exemplary variation of a hardware configuration of image reading apparatus 1. Image reading apparatus 1 represented in FIG. 16 further includes an LED unit 18. CPU 101 controls an operation of LED unit 18.

Figure 17:
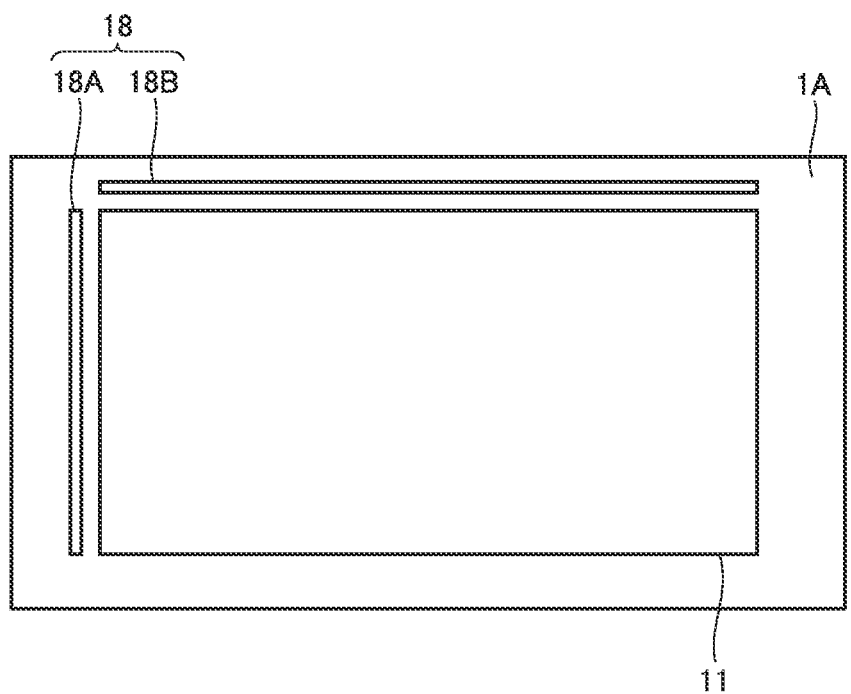
FIG. 17 schematically shows a vicinity of a platen glass of the image reading apparatus of FIG. 16.

FIG. 17 schematically shows a vicinity of platen glass 11 of image reading apparatus 1 of FIG. 16. As shown in FIG. 17, body 1A of image reading apparatus 1 includes platen glass 11, a first LED unit 18A, and a second LED unit 18B. First LED unit 18A and second LED unit 18B configure LED unit 18. First LED unit 18A and second LED unit 18B each include a plurality of LED elements for example.

Figure 18:
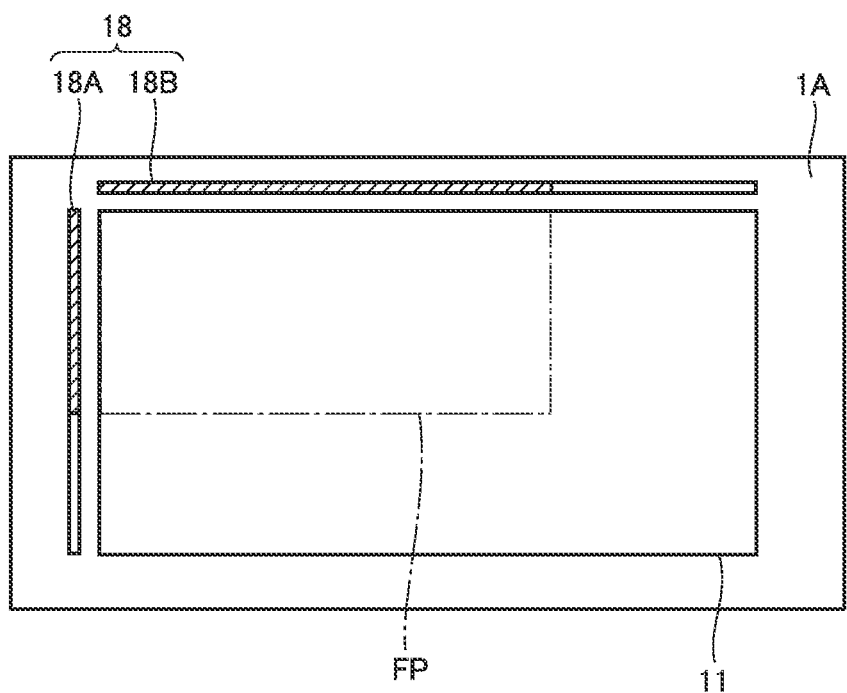
FIG. 18 shows an example of a manner of turning on a first light emitting diode (LED) unit and a second LED unit.

CPU 101 can turn on only a portion of each of first LED unit 18A and second LED unit 18B corresponding to an original placement permission region. FIG. 18 shows an example of a manner of turning on first LED unit 18A and second LED unit 18B. In FIG. 18, as a reference, an original placement permission region determined relative to platen glass 11 is represented by a frame FP. First LED unit 18A extends in the first direction. Second LED unit 18B extends in the second direction. FIG. 18 shows first LED unit 18A and second LED unit 18B each with a turned-on portion hatched.

In the example of FIG. 18, CPU 101 turns on first LED unit 18A only at a portion corresponding to frame FP in the first direction and turns on second LED unit 18B only at a portion corresponding to frame FP in the second direction.

CPU 101, for example at a time of maintenance, determines an original placement permission region and stores to a storage device such as RAM 102 information which identifies the original placement permission region. Thereafter, CPU 101 turns on first LED unit 18A and second LED unit 18B to point to the current original placement permission region until a new original placement permission region is determined.

According to the present disclosure, the image reading apparatus reads a quantity of light incident on each of the plurality of regions on the platen glass and outputs information which identifies any region of the plurality of regions in which a quantity of light read therefrom exceeds a given value. Thus the image reading apparatus can provide a user with more beneficial information when the platen receives ambient light.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:
1. An image reading apparatus comprising:
   a platen glass for placing an original thereon;
   a cover for covering the platen glass;
   an image reader for reading an image of the original on the platen glass, the image reader including (i) a light source for radiating light to the platen glass, and (ii) at least one sensor configured to detect a quantity of light for each of a plurality of regions on the platen glass, each of the plurality of regions being rectangular;

a hardware processor configured to, in response to an instruction input by a user in a state in which the cover is open and no original is placed on the platen glass, (i) control the image reading apparatus to perform scanning by the image reader to detect the quantity of light for each of the plurality of regions in a first state in which the light source is not radiating light to the platen glass, and (ii) obtain the quantity of light obtained by the scanning performed in the first state;

an output interface configured to output information which identifies one or more regions of the plurality of regions in which the quantity of light obtained in response to the instruction exceeds a given value; and a display device configured to display the information output by the output interface.

2. The image reading apparatus according to claim 1, wherein the output interface is configured to output the information which is used to determine a rectangle included in a region on the platen glass in which the quantity of light read therefrom does not exceed the given value.

3. The image reading apparatus according to claim 1, wherein the output interface is configured to output information representing that ambient light is not detected in any region of the platen glass when the quantity of light does not exceed the given value in any of the plurality of regions.

4. The image reading apparatus according to claim 1, wherein the output interface is configured to output information representing that ambient light is detected in all of the regions of the platen glass when the quantity of light exceeds the given value in all of the plurality of regions.

5. The image reading apparatus according to claim 1, wherein the display device is further configured to schematically display the platen glass and to schematically display a region of the platen glass identified based on the information output by the output interface.

6. The image reading apparatus according to claim 1, further comprising an indicator configured to point to a position on the platen glass based on the information output by the output interface.

7. A method for controlling an image reading apparatus, the image reading apparatus comprising a platen glass, a cover for covering the platen glass, and an image reader, and the method comprising:

in response to an instruction input by a user in a state in which the cover is open and no original is placed on the platen glass, (i) detecting a quantity of light incident on each of a plurality of regions on the platen glass by performing scanning by the image reader in a first state in which a light source of the image reader is not radiating light to the platen glass, each of the plurality of regions being rectangular, and (ii) obtaining the quantity of light obtained by the scanning performed in the first state;

outputting information which identifies one or more regions of the plurality of regions in which the quantity of light obtained in response to the instruction exceeds a given value; and displaying, on a display device, the output information.

* * * * *